(12) United States Patent
Fasce et al.

(10) Patent No.: US 9,001,995 B2
(45) Date of Patent: Apr. 7, 2015

(54) TELECOMMUNICATIONS MODULE WITH DISCONNECTION FEATURE

(75) Inventors: Xavier Fasce, Verchaix (FR); Pierre Bonvallat, Campinas (FR); Hong Lu, Shanghai (CN); Jingwen Zhong, Shanghai (CN); Guy Metral, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/638,303

(22) PCT Filed: Mar. 30, 2010

(86) PCT No.: PCT/CN2010/000403
§ 371 (c)(1),
(2), (4) Date: Sep. 28, 2012

(87) PCT Pub. No.: WO2011/120191
PCT Pub. Date: Oct. 6, 2011

(65) Prior Publication Data
US 2013/0010948 A1    Jan. 10, 2013

(51) Int. Cl.
*H04M 1/00* (2006.01)
*H01R 13/703* (2006.01)
(Continued)

(52) U.S. Cl.
CPC .......... *H01R 13/7034* (2013.01); *H01R 13/701* (2013.01); *H01R 2201/16* (2013.01); *H04Q 1/142* (2013.01); *H01R 2201/20* (2013.01)

(58) Field of Classification Search
CPC .... H04M 11/062; H04M 1/745; H04Q 1/028; H01R 2103/00; H01R 13/518; H01R 25/006; H01H 85/204

USPC ........ 379/413.02–413.04; 439/188, 534, 535, 439/676, 775
See application file for complete search history.

(56) References Cited

U.S. PATENT DOCUMENTS

| 3,798,507 A | 3/1974 | Damon |
| 4,618,204 A | 10/1986 | Saligny |
| 5,175,662 A | 12/1992 | DeBalko |

(Continued)

FOREIGN PATENT DOCUMENTS

| DE | 26 43 150 A1 | 3/1978 |
| DE | 39 19 621 A1 | 12/1990 |

(Continued)

OTHER PUBLICATIONS

Supplementary European Search Report for EP 10848653.1, mailed May 9, 2014, 2 pp.

*Primary Examiner* — Akelaw Teshale
(74) *Attorney, Agent, or Firm* — Janet A. Kling (57) ABSTRACT

A telecommunications module (1) comprises at least one pair of contact elements (13, 15) each extending between opposed sides (7, 8) of the module and having contacts (9, 10) at each end to which connections can be made. Each contact element comprises first and second parts (17, 19), the first part being resiliently-biased into engagement with the second part at a disconnection point (21), and a separating member (23) is located between the disconnection points of the pair of contact elements. The separating member (23) is shaped to deflect a probe (29), inserted into the module from one of the opposed sides, towards the disconnection point of a selected one of the pair of contact elements to break the engagement between the first and second parts of that contact element.

20 Claims, 6 Drawing Sheets

(51) Int. Cl.
*H01R 13/70* (2006.01)
*H04Q 1/14* (2006.01)

(56) References Cited

U.S. PATENT DOCUMENTS

| | | |
|---|---|---|
| 5,575,689 A | 11/1996 | Baggett |
| 5,800,187 A | 9/1998 | Vermon |
| 5,895,294 A * | 4/1999 | DeLangis et al. ............. 439/669 |
| 5,967,826 A | 10/1999 | Letailleur |
| 6,135,796 A * | 10/2000 | Wilson et al. ................ 439/215 |
| 6,785,325 B1 | 8/2004 | Liu |
| 6,996,232 B1 | 2/2006 | Staber |
| 7,018,229 B2 | 3/2006 | Otto |
| 7,059,864 B2 | 6/2006 | Matthies |
| 7,268,993 B2 | 9/2007 | Dement |
| 7,892,046 B2 * | 2/2011 | Metral et al. ................ 439/709 |
| 7,894,209 B2 | 2/2011 | Metral |
| 2002/0118820 A1 | 8/2002 | Sinclair |
| 2003/0002641 A1 | 1/2003 | Schmokel |
| 2003/0002655 A1 | 1/2003 | Miller |
| 2003/0043997 A1 | 3/2003 | Witty |
| 2005/0063531 A1 | 3/2005 | Arias |
| 2005/0141695 A1 | 6/2005 | Arias |
| 2006/0160404 A1 | 7/2006 | Alarcon |
| 2008/0273690 A1 * | 11/2008 | Bonvallat et al. ........ 379/387.01 |
| 2011/0281459 A1 | 11/2011 | Metral |

FOREIGN PATENT DOCUMENTS

| | | |
|---|---|---|
| EP | 0 522 540 A1 | 1/1993 |
| EP | 0 909 102 A2 | 4/1999 |
| EP | 1 246 317 | 10/2002 |
| EP | 1 578 145 | 9/2005 |
| EP | 1 744 404 | 1/2007 |
| EP | 1 804 523 | 7/2007 |
| FR | 2 770 773 | 4/1999 |
| WO | WO 02/076109 | 9/2002 |
| WO | WO 2004/032533 | 4/2004 |

* cited by examiner

TELECOMMUNICATIONS MODULE WITH DISCONNECTION FEATURE

FIELD OF THE INVENTION

The present invention relates to a telecommunications module for use in a telecommunications system to establish an electrical connection between an incoming wire and an outgoing wire.

BACKGROUND OF THE INVENTION

In the field of telecommunications, numerous customers are connected with the switch of a telecommunications company via telecommunications lines. Customers are also sometimes referred to as subscribers. The switch is also often called an exchange or "PBX" (central office exchange operated by the telecommunications company). Between the subscriber and the switch, sections of telecommunications lines are connected with telecommunications modules. The telecommunications modules establish an electrical connection between incoming wires and outgoing wires of telecommunications lines. Plural telecommunications modules can be put together at a distribution point, such as a main distribution frame, an intermediate distribution frame, an outside cabinet or a distribution point located, for example, in an office building or on a particular floor of an office building. To allow flexibility in wiring some telecommunications lines are connected with first telecommunications modules in a manner to constitute a permanent connection. Flexibility is realized by so-called jumpers or cross connects, which flexibly connect contacts of a first telecommunications module with contacts of a second telecommunications module. These jumpers can be changed when, for example, a person moves within an office building to provide a different telephone (i.e., a different telephone line) with a telephone number the relocated person intends to keep.

Within a telecommunications module, the electrical connections between the incoming and outgoing wires of telecommunications lines are provided by contact elements with contacts at each end to which wires can be connected. In some telecommunications modules, the contact elements are all generally U-shaped so that the end contacts are all located on the same side of the module: examples of such modules are described in U.S. Pat. No. 5,967,826 (Letailleur). Telecommunications modules are also known in which the contact elements extend between opposed sides of the module: examples of such dual-sided modules are described in EP-A-1 744 404 (Reichle & De-Massari AG); U.S. Pat. No. 4,618,204 (Saligny); U.S. Pat. No. 3,798,587 (Ellis et al); US-A-2006/0160404 (Alarcon et al); and EP-A-1 804 523 and 1 246 317 (3M Innovative Properties Company).

Telecommunications modules employing contact elements that extend between opposed sides of the module offer the advantage that the incoming and outgoing wires can be separated to respective sides of the module enabling more efficient use to be made of whatever space is available, and enabling installation procedures to be simplified. In some cases, the contact elements are arranged substantially side-by-side in a single row but it is also known to arrange the contact elements in two opposed rows with a view to providing a more compact telecommunications module, and hence a higher density of connections.

Some telecommunications modules employ contact elements, hereinafter referred to as disconnection contact elements, comprising two parts which resiliently engage one another at a disconnection point intermediate the ends of the contact element. The disconnection point allows a device to be inserted, from outside the telecommunications module, between the two parts of the contact element for various purposes. The device may, for example, be an electrically-insulating disconnection probe that is inserted to disconnect a line, or an electrically-conducting test probe that is inserted to test or monitor a line. In some cases, the device may be a functional plug that is inserted to provide, for example, over-voltage or over-current protection.

Examples of telecommunications modules incorporating disconnection contact elements are described in the above-mentioned U.S. Pat. No. 5,967,826; US-A-2006/0160404; EP-A-1 804 523; and EP-A-1 246 317.

SUMMARY OF THE INVENTION

The present invention relates to telecommunications modules of the dual-sided type, comprising at least one pair of contact elements each extending between opposed sides of the module (more especially, a plurality of such pairs of contact elements arranged in two, preferably identical, opposed rows). The invention is concerned with the provision of a module of that type in which disconnection contact elements can be employed without a substantial increase in the thickness of the module. The invention is further concerned with enabling an external probe to be correctly directed towards the disconnection point of a selected disconnection contact element.

The present invention provides a telecommunications module comprising at least one pair of contact elements each extending between opposed sides of the module and having contacts at each end to which connections can be made, wherein each contact element comprises first and second parts, the first part being resiliently-biased into engagement with the second part at a disconnection point, and wherein a separating member is located between the disconnection points of the pair of contact elements; the separating member being shaped to deflect a probe, inserted into the module from one of the opposed sides, towards the disconnection point of a selected one of the pair of contact elements to break the engagement between the first and second parts of that contact element.

The telecommunications module may, for example, be a termination module or a DSLAM (Digital Subscriber Line Access Multiplexer) module.

The provision of the separating member can ensure that a probe is correctly directed towards a selected disconnection point without the need for increased separation between the pair of contact elements and a consequent increase in the thickness of the module. In the case in which the module is a termination module, for example, the probe may be an electrically-insulating disconnection probe that is inserted to disconnect a telecommunications line, or an electrically-conducting test probe that is inserted to test or monitor a line. In the case in which the module is a DSLAM module, for example, the probe may be an electrically-conductive probe that is connected into a DSLAM line for a testing or maintenance operation.

In an advantageously simple form, the separating member has a tapered probe-deflecting end directed towards the said one of the opposed sides of the module. In that case, a single slot in the module housing may suffice to provide access for a probe to both contact elements of a pair, the tapered end of the separating member being directed towards the access slot.

The second parts of the contact elements may be supported by the separating member on opposite sides thereof. Such an arrangement enables efficient use to be made of the available space within the module, particularly if the separating member functions to electrically-isolates the second parts of the contact elements from one another, and may also permit an enhanced contact force between the two parts of a contact element. In the case in which the module housing is a moulded component, manufacture of the housing can be simplified if the separating member is an integrally-moulded part of the housing.

A probe for use with a telecommunications module in accordance with the invention may be asymmetrically-shaped, at least in part, whereby, in one orientation, it will be directed by the separating member towards the disconnection point of one of the pair of contact elements and, in another orientation, it will be directed by the separating member towards the disconnection point of the other of the pair of contact elements. The probe may comprise a handle by which it can be inserted into the module and a leading end that is asymmetrically shaped in the plane of the disconnection points of the pair of contact elements.

Typically, a telecommunications module in accordance with the invention will comprise a plurality of the said pairs of contact elements, the contact elements being arranged in two, preferably identical, opposed rows with one contact element of each pair in each row. In the case of a termination module, the contact elements are preferably shaped to provide enhanced cross-talk attenuation between different subscriber lines. In an embodiment of the invention, that is achieved by shaping each contact element so that the central region containing the disconnection point is narrower than the end regions containing the contacts and off-set with respect to an axis extending between the latter. The contact elements are then arranged so that, in consecutive pairs along a row (each associated with a respective subscriber line), the central regions lie closer to one another than to the corresponding portions of the adjacent pairs of contact elements.

A DSLAM module in accordance with the invention may be used in a connector block in combination with two further telecommunications modules, each of the further modules having the same number of contact elements as the DSLAM module, wherein half of the contact elements of each further module are adapted to transmit a line signal and the other half are adapted to transmit a POTS signal. The connector block may be used in combination with a splitter connectable to a contact element of the DSLAM module and a pair of contact elements of one of the further modules. In one embodiment, the splitter is connectable with the contact element of the DSLAM module from the other one of the said opposed sides and, as already described above, the probe is an electrically-conductive probe that is connected into a DSLAM line for a testing or maintenance operation.

BRIEF DESCRIPTION OF THE DRAWINGS

By way of example only, embodiments of the invention will be described below with reference to the accompanying drawings, in which.

DESCRIPTION OF THE PREFERRED EMBODIMENTS OF THE INVENTION

Figure 1:
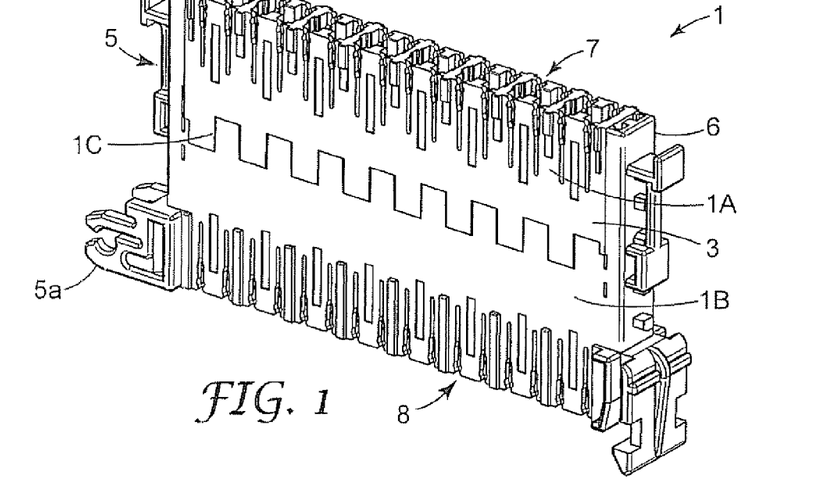
FIG. 1 is a perspective view of a telecommunications module in accordance with the invention.

FIG. 1 shows a termination module 1 which, typically in combination with other similar modules, may form part of a telecommunications assembly which may be mounted, in a known manner, such as in a suitable rack or frame.

The termination module 1 has opposed lateral faces 3, 4 (of which only the face 3 is visible in FIG. 1), opposed transverse sides 5, 6, and opposed longitudinal sides 7, 8. The termination module comprises two moulded plastic housing parts 1A, 1B that are formed with inter-engaging projections and recesses 1C where they come together. The housing part 1B is formed with pivotal connection 5a at the transverse side 5, by which it can be pivotally-mounted on a suitable back-mount frame, for example as part of a block comprising a plurality of termination modules. Within the termination module 1, as described in greater detail below, are contact elements that, for the purposes of this description, are assumed to connect incoming wire pairs at the side 7 of the module (hereinafter referred to as the front side) and outgoing wire pairs at the side 8 (hereinafter referred to as the rear side). The contact elements are arranged side-by-side in two face-to-face rows that extend along the length of the module 1.

Each contact element has suitable contacts 9, 10 at its ends (not visible in FIG. 1) for connection, on each longitudinal side of the termination module, to a wire of a telecommunications line. The slots 11 can be seen most clearly in FIG. 5, to be described below. As illustrated, the contacts 9, 10 are conventional insulation-displacement contacts (IDCs) having respective push-in slots 11 in the body of the termination module 1 for the insertion of wires in known manner. Alternative suitable contacts are conventional wire wrap contacts. Each pair of adjacent contacts 9A, 9B; 10A, 10B in a row (see FIG. 5) is assigned to a respective subscriber wire pair.

Termination modules of this general type are known and offer the advantage that connections to different groups of wires (POTS and line wires in this case), can be made to contacts on opposite longitudinal sides of a module. This enables all the wires that require less frequent change to be located at one, possibly less accessible, side of the module. For example, all of the line wires may be connected to the rear side 8 of the module and all of the POTS wires to the front side 7. In addition, a single module of this type can be more compact than two modules that each comprises only one row of contacts, and can thus also enable a comparatively high density of connections to be achieved.

Figure 2:
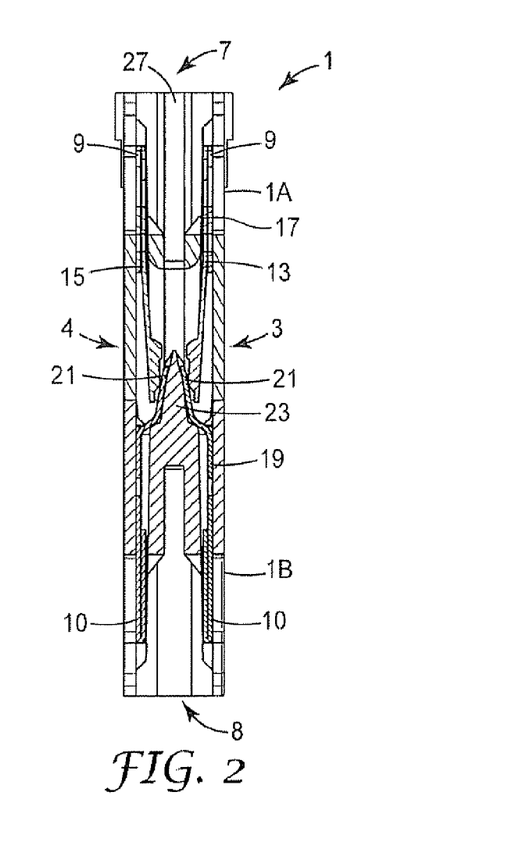
FIG. 2 is a diagrammatic transverse cross-section through the module of FIG. 1, showing one of the pairs of opposed contact elements in the module.

The form of the contact elements within the termination module 1 will now be described with reference to FIGS. 2 and 3. FIG. 2 is a transverse cross-section of the module, in which two facing contact elements 13, 15, one in each of the rows in the termination module, are visible. The contact elements 13, 15 are mirror images of each other and, as already mentioned, each has an IDC 9 at one end on the front side 7 of the termination module 1, and an IDC 10 at the opposite end on the rear side 8 of the module. Each contact element is in two parts, namely a front part 17 extending from the IDC 9 and a rear part 19 extending from the IDC 10. Intermediate the IDCs 9, 10, each contact element includes a disconnection point 21 at which the inner end of the front part 17 is resiliently-biased into engagement with the inner end of the rear part 19, the latter being supported at this point on a respective side of a separating member 23 located between the pair of facing contact elements 13, 15. The separating member 23 extends from a wall structure within the rear housing part 1B of the termination module 1 and is advantageously an integrally-moulded part of the housing of the termination module 1. The separating member has a tapered end 25 which is directed towards an access slot 27 formed in the front side 7 of the termination module between the IDCs 9 of the contact elements 13, 15.

Figure 3:
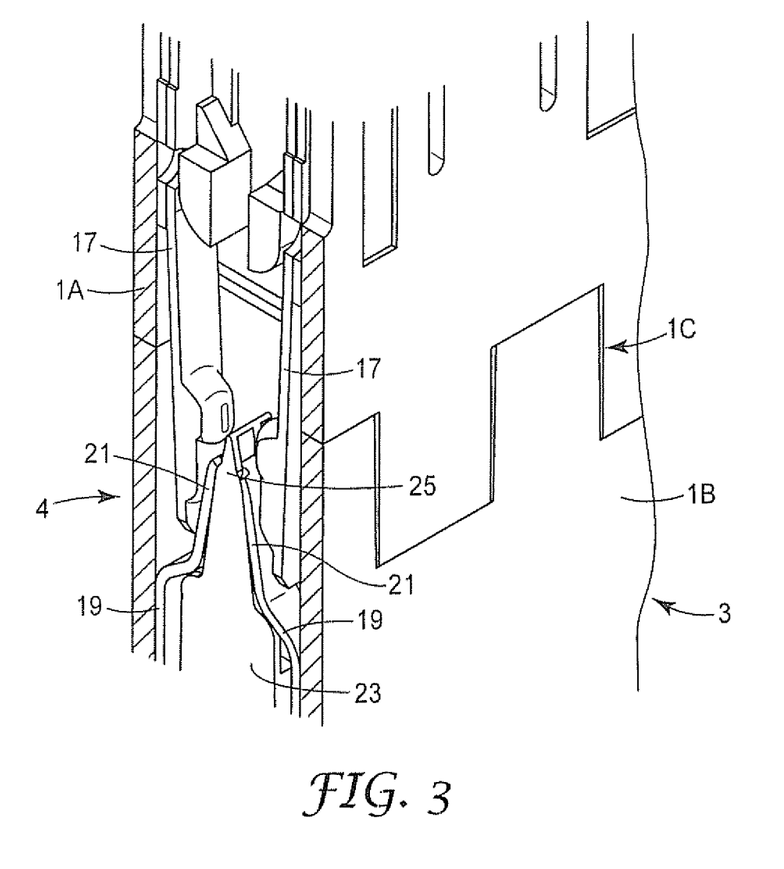
FIG. 3 is a detailed perspective view of the disconnection points of the contact elements of FIG. 2.

FIG. 3 is a detailed view of the disconnection points 21 of the contact elements 13, 15. The separating member 23 is formed from an insulating material and is of sufficient thickness to ensure that the rear parts 19 of the contact elements 13, 15 are electrically-isolated from one another. The separating member 23 enables efficient use to be made of the available space within the module, and the support provided by the separating member for the rear part 19 of a contact element at the disconnection points 21 may also permit an enhanced contact force between the two parts 17, 19 of the contact element.

The disconnection point 21 in each contact element 13, 15 enables the direct electrical connection between the front and rear parts 17, 19 of one of the contact elements to be interrupted by means of a probe inserted into the termination module 1 through the access slot 27 in the front side 7 of the module, as will be described below. The probe can be used in known manner to disconnect a line, or to test or monitor a line.

Figure 4:
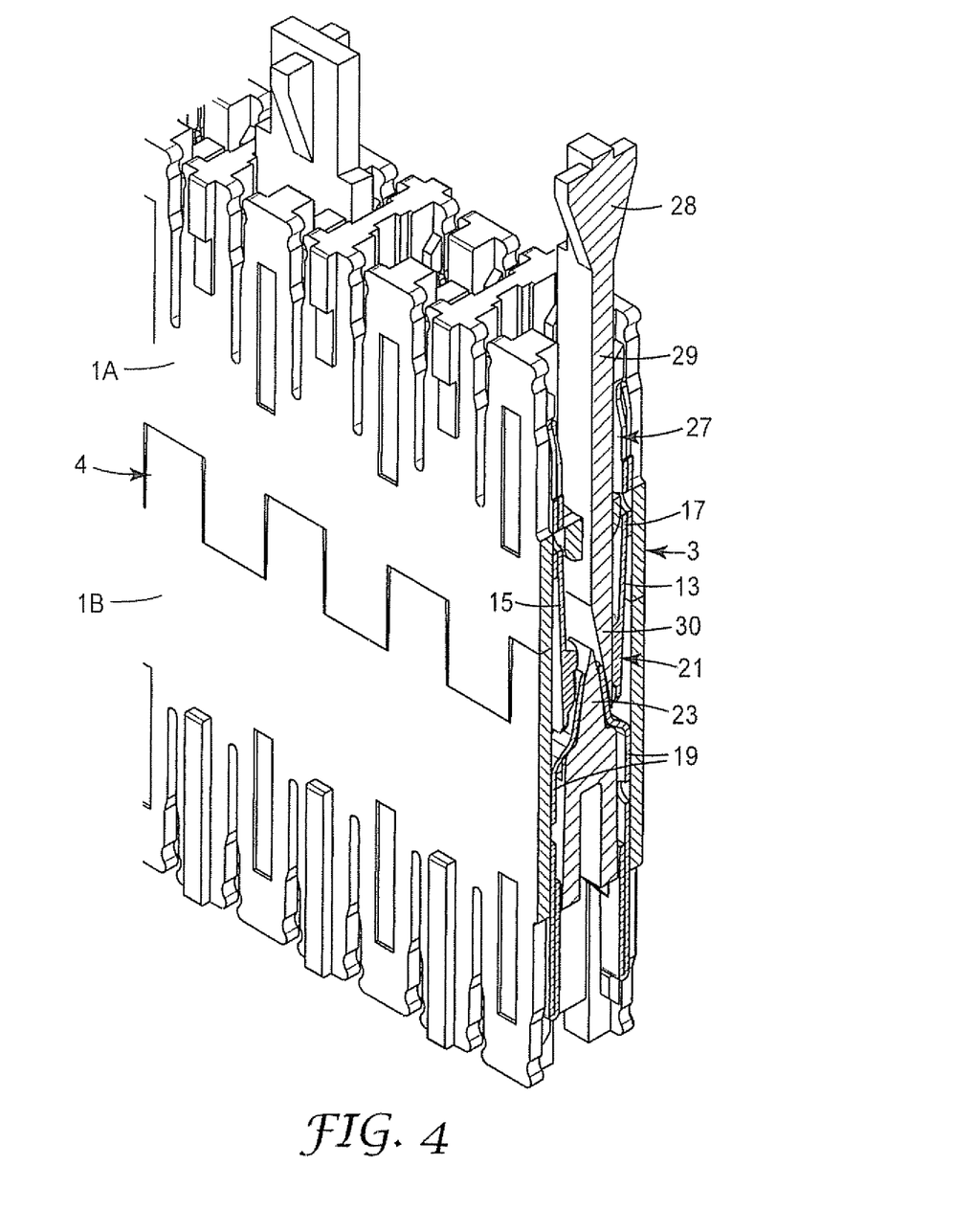
FIG. 4 is another perspective view showing a probe being inserted into the disconnection point of one of the contact elements of FIG. 3.

FIG. 4 shows a probe 29 inserted through the access slot 27 into the disconnection point 21 of one of a pair of contact elements 13, 15 (in this case, the contact element 13). The probe 29 has a handle 28 by which it can be inserted into the access slot 27 and, at its leading end 30, is asymmetrically tapered when viewed in a direction perpendicular to a plane containing the disconnection points 21 of this pair of contact elements 13, 15 so that, depending on its orientation, it will be directed to one side or the other of the separating member 23 by engagement with the tapered end 25 of the latter. In FIG. 4, the probe 29 has been directed to the side of the separating member 23 on which the contact element 13 is located and, consequently, has entered the disconnection point 21 in that contact element. If the probe 29 were to be rotated through 180° before being inserted through the access slot 27, it would be directed to the side of the separating member 23 on which the contact element 15 is located and, consequently, would enter the disconnection point 21 in that contact element instead.

Figure 5:
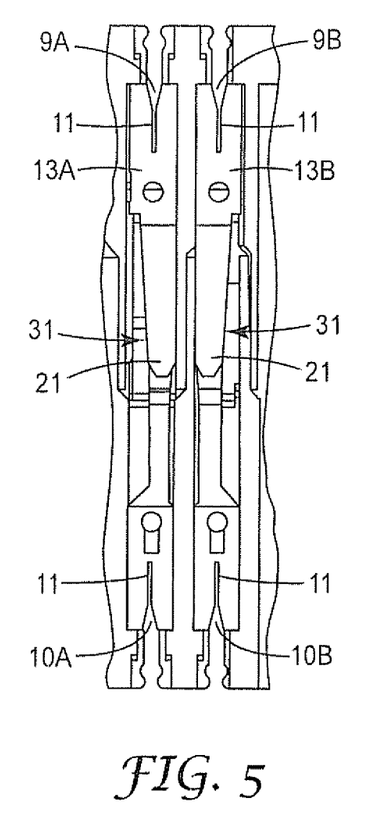
FIG. 5 is a view of two adjacent contact elements in the module of FIG. 1.

Advantageously, the contact elements 13, 15 are asymmetrically-shaped when viewed in plan (i.e. as viewed from the right or the left side of FIG. 2, with the adjacent lateral face 3, 4 of the termination module removed). FIG. 5 shows one pair of adjacent contact elements 13 when viewed in this way, the contact elements of the pair here being labelled 13A, 13B. The central region 31 of each contact element 13A, 13B, containing the disconnection point 21, is narrower than the end portions containing the IDCs 9A, 10A; 9B, 10B respectively and off-set with respect to an axis extending between the latter. The directions in which the central regions 31 are off-set are such that, for each pair, the central regions lie closer to one another than to the corresponding portions of the adjacent pair, thereby enabling better cross-talk attenuation between different subscriber lines to be achieved.

A plurality of termination modules as shown in FIG. 1 can be assembled in a stack, in known manner, in a suitable rack, frame or cabinet in any required orientation.

Figure 6:
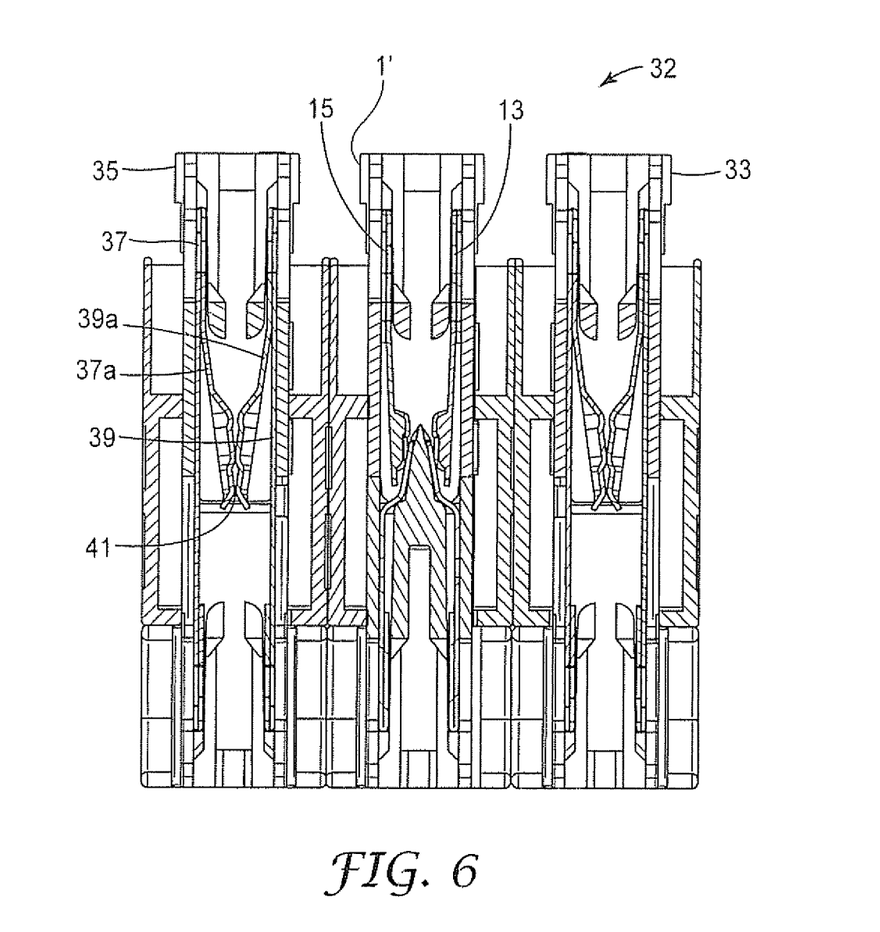
FIG. 6 is a cross-section of a connector block comprising a telecommunications module as shown in FIGS. 1 to 3 in combination with two other telecommunications modules.

FIG. 6 illustrates another use of a termination module 1' of the type described above with reference to FIGS. 1 to 4. In this case, the termination module 1' provides contacts for connection to DSLAM (Digital Subscriber Line Access Multiplexer) wires and is used in a connector block 32 in combination with two other termination modules 33, 35, one on either side of the termination module 1', that provide contacts for connection to POTS and line wires as described in greater detail below. Components of the module 1' that correspond to components of the module 1 described above carry the same reference numerals.

Termination modules for telecommunication assemblies comprising wires that carry line, POTS and DSLAM signals are known, examples of such modules being described in the above-mentioned EP-A-1 804 523, and in EP-A-1 578 145 and 1 804 524 (also in the name of 3M Innovative Properties Company). The modules are used in implementing Asymmetric Digital Subscriber Line (or "ADSL") technology, which allows voice and data signals to be combined and transmitted at different frequencies on a single line. So-called splitters are used when it is required to split (or combine) voice and data signals, and the separated voice and data signals are transmitted using POTS and DSLAM wires respectively.

In the connector block 32 shown in FIG. 6, the termination modules 33, 35 are symmetrical with respect to the termination module 1', and each is associated with the adjacent row of contact elements 13, 15 in the module 1' Therefore only one half of the connector block 32, (comprising the termination module 35 and the associated row of contact elements 15 in the module 1') will be described in detail below.

The termination module 35 comprises pairs of facing contact elements 37, 39 arranged in rows extending perpendicular to the plane of the drawings. Each of the contact elements 37, 39 has suitable contacts at its ends for connection, on the front and rear sides of the termination module 35, to a wire of a telecommunications line. In addition, the contact elements 37, 39 have respective spring tabs 37a, 39a that extend into contact with each other at their free ends and form a disconnection point 41. The contact elements 37 are adapted to transmit a POTS signal, the contact elements 39 are adapted to transmit a line signal and, as already indicated above, the associated contact elements 15 of the termination module 1' are adapted to transmit a DSLAM signal.

Figure 7:
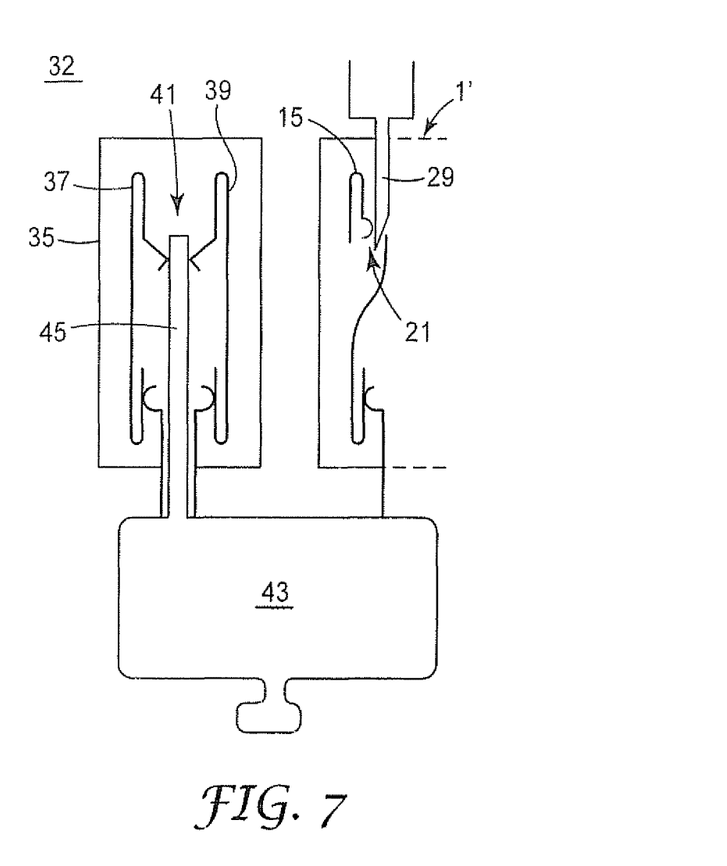
FIG. 7 is a diagrammatic representation of one half of the connector block of FIG. 6 in use.

As described in the above-mentioned EP-A-1 578 145, a splitter 43 can be connected with the contact elements 37, 39, 15 from the rear end of the connector block 32 as shown schematically in FIG. 7, which is a diagrammatic illustration of such an operation implemented for the half of the connector block 32 that comprises the termination module 35 and the associated row of contact elements 15 in the module 1'. This will connect the contact elements 37, 39, 15 with a printed circuit board within the splitter 43 and with the electrical components, including suitable filters, necessary to split a combined voice and data signal or to combine separate voice and data signals. In addition, the disconnection point 41 in the termination module 35 permits the insertion of a plug 45 from the rear end of the connector block 32, for example for testing purposes or for the introduction of over-voltage/over-current protection.

FIG. 7 also shows how a probe 29 of the type shown in FIG. 4, inserted into the termination module 1' in the appropriate orientation from the front end of the connector block 32, can be used to introduce an optional connection with an external functional module into the DSLAM line through contact element 15. In this case, the probe 29 has been inserted into the disconnection point 21 of contact element 15 in the module 1' to disconnect the splitter 43 and establish a connection into the DSLAM line for testing purposes or a maintenance operation, for example synchronization of a DSLAM.

The connector block 32, possibly together with other similar modules, can be mounted in known manner, in a suitable rack, frame or cabinet in any required orientation. Carriers to which connector blocks comprising three termination modules can be releasably-attached are described, for example, in the above-mentioned EP-A-1 578 145.

The invention claimed is:

1. A telecommunications module comprising a module housing, at least one pair of contact elements each disposed within and extending between opposing sides of the module housing and having contacts at each end to which connections can be made, wherein each contact element comprises first and second parts, the first part being resiliently-biased into engagement with the second part at a disconnection point, and wherein a separating member is located between the disconnection points of the pair of contact elements;

the separating member being shaped to deflect a probe, inserted into the module from one of the opposed sides, towards the disconnection point of a selected one of the pair of contact elements to break the engagement between the first and second parts of that contact element.

2. The module as claimed in claim 1, in which the separating member has a tapered probe-deflecting end directed towards the said one of the opposed sides of the module.

3. The module as claimed in claim 2, in which the tapered end of the separating member is directed towards an access slot in the module housing, through which slot a probe can be inserted into the module.

4. The module as claimed in claim 1, in which the second parts of the contact elements are supported by the separating member on opposite sides thereof.

5. The module as claimed in claim 4, in which separating member electrically-isolates the said second parts of the contact elements from one another.

6. The module as claimed in claim 1, in which the module housing is a moulded component and the separating member is an integrally-moulded part of the housing.

7. The module as claimed in claim 1 in combination with a probe insertable into the module from the said one of the opposed sides to engage the separating member, the disconnection probe being asymmetrically-shaped whereby, in one orientation, it will be directed by the separating member towards the disconnection point of one of the pair of contact elements and, in another orientation, it will be directed by the separating member towards the disconnection point of the other of the pair of contact elements.

8. The module as claimed in claim 1, comprising a plurality of the said pairs of contact elements, the contact elements being arranged in two opposed rows with one contact element of each pair in each row.

9. The module as claimed in claim 1, wherein the module is a DSLAM module in which the contact elements are adapted to transmit DSLAM signals.

10. A connector block comprising a DSLAM module, wherein the DSLAM module comprises a module housing, at least one pair of contact elements each disposed within and extending between opposing sides of the module housing and having contacts at each end to which connections can be made, wherein each contact element comprises first and second parts, the first part being resiliently-biased into engagement with the second part at a disconnection point, and wherein a separating member is located between the disconnection points of the pair of contact elements;

the separating member being shaped to deflect a probe, inserted into the module from one of the opposed sides, towards the disconnection point of a selected one of the pair of contact elements to break the engagement between the first and second parts of that contact element wherein the contact elements are adapted to transmit DSLAM signals; and two further telecommunications modules, each of the further telecommunication modules having the same number of contact elements as the DSLAM module, wherein half of the contact elements of each further telecommunication module are adapted to transmit a line signal and wherein half of the contact elements of each further telecommunication module are adapted to transmit a POTS signal.

11. The connector block as claimed in claim 10, in which the DSLAM module is arranged between the two further telecommunication modules.

12. The connector block as claimed in claim 10, further comprising a splitter connectable to a contact element of the DSLAM module and a pair of contact elements of one of the further telecommunication modules.

13. A telecommunications module comprising a module housing, at least one pair of facing contact elements each disposed within and extending between opposing sides of the module housing and having contacts at each end to which wire connections can be made, wherein each contact element of the at least one pair of facing contact elements comprises a first part, a second parts and a disconnection point between the first part and the second part, wherein the first part is resiliently-biased into engagement with the second part at the disconnection point, and a separating member is integrally formed with the housing and disposed between the disconnection points of each contact element of the at least one pair of facing contact elements; wherein the separating member deflects a probe inserted into the telecommunication module from one of the opposed sides, into the disconnection point of a selected contact element of the at least one pair of facing contact elements to break the engagement between the first part and the second parts of the selected contact element.

14. The module of claim 13, wherein the contact elements of the at least one pair of facing contact elements are disposed in a mirror image arrangement.

15. The module of claim 14, wherein the separating member has a tapered probe-deflecting end directed towards the access slot.

16. The module of claim 13, further comprising an access slot through which the probe can be inserted into the module, wherein the access slot is disposed between the contact elements of the at least one pair of facing contact elements.

17. The module of claim 13, in which the second parts of each contact element of the at least one pair of facing contact elements are supported by the separating member on opposite sides thereof at the disconnection points of each contact element.

18. The module of claim 17, in which separating member electrically-isolates the second parts of each contact element of the at least one pair of facing contact elements from one another.

19. The module of claim 13 in combination with a probe inserted into the module from the said one of the opposed sides to engage the separating member, wherein the probe is asymmetrically-shaped whereby, in one orientation, it will be directed by the separating member towards the disconnection point of one contact element of the pair of facing contact elements and, in another orientation, it will be directed by the separating member towards the disconnection point of the other contact element of the pair of facing contact elements.

20. The module of claim 13, comprising a plurality of pairs of facing contact elements, wherein the contact elements of the pairs of facing contact elements are arranged side-by-side in two face-to-face rows that extend along the length of the telecommunication module.

\* \* \* \* \*